(12) United States Patent
Seine

(10) Patent No.: US 9,161,374 B2
(45) Date of Patent: Oct. 13, 2015

(54) AUTOMATICALLY CONFIGURING WIRELESS NETWORKS

(71) Applicant: Verizon Deutschland GmbH, Dortmund (DE)

(72) Inventor: Martin Seine, Haltern am See (DE)

(73) Assignee: Verizon Deutschland GmbH, Dortmund (DE)

(*) Notice: Subject to any disclaimer, the term of this patent is extended or adjusted under 35 U.S.C. 154(b) by 96 days.

(21) Appl. No.: 14/069,786

(22) Filed: Nov. 1, 2013

(65) Prior Publication Data

US 2015/0124790 A1    May 7, 2015

(51) Int. Cl.
*H04B 7/00*     (2006.01)
*H04W 4/00*     (2009.01)
*H04W 76/00*    (2009.01)
*H04W 24/00*    (2009.01)
*H04W 52/02*    (2009.01)
*H04W 88/08*    (2009.01)

(52) U.S. Cl.
CPC .............. *H04W 76/00* (2013.01); *H04W 24/00* (2013.01); *H04W 52/0206* (2013.01); *H04W 88/08* (2013.01)

(58) Field of Classification Search
CPC ..... H04W 48/00; H04W 48/06; H04W 48/16; H04W 28/20
See application file for complete search history.

(56) References Cited

U.S. PATENT DOCUMENTS

| 2003/0098777 | A1* | 5/2003 | Taylor et al. ................. 340/5.61 |
| 2006/0002326 | A1* | 1/2006 | Vesuna ......................... 370/328 |
| 2008/0057958 | A1* | 3/2008 | Bennett ....................... 455/435.1 |
| 2008/0227454 | A1* | 9/2008 | Damnjanovic ............... 455/436 |
| 2009/0161582 | A1* | 6/2009 | Kammer et al. ............. 370/254 |
| 2014/0031036 | A1* | 1/2014 | Koo et al. .................... 455/434 |

* cited by examiner

*Primary Examiner* — Melanie Jagannathan

(57) ABSTRACT

A controller stores preference information related to an initial configuration of wireless access points (WAPs). Based on the preference information, the controller initially activates or deactivates the WAPs to form a wireless local network (WLAN). The WLAN is monitored and operation of the WAPs may be modified based on the monitoring of the WLAN. For example, the controller may monitor an activity level associated with an active group of the WAPs and may compare the activity level to a threshold. The controller may activate an additional WAP if, for example, the activity level is above an upper threshold, and the controller may deactivate one of the active WAPs if the activity level is below a lower threshold.

20 Claims, 15 Drawing Sheets

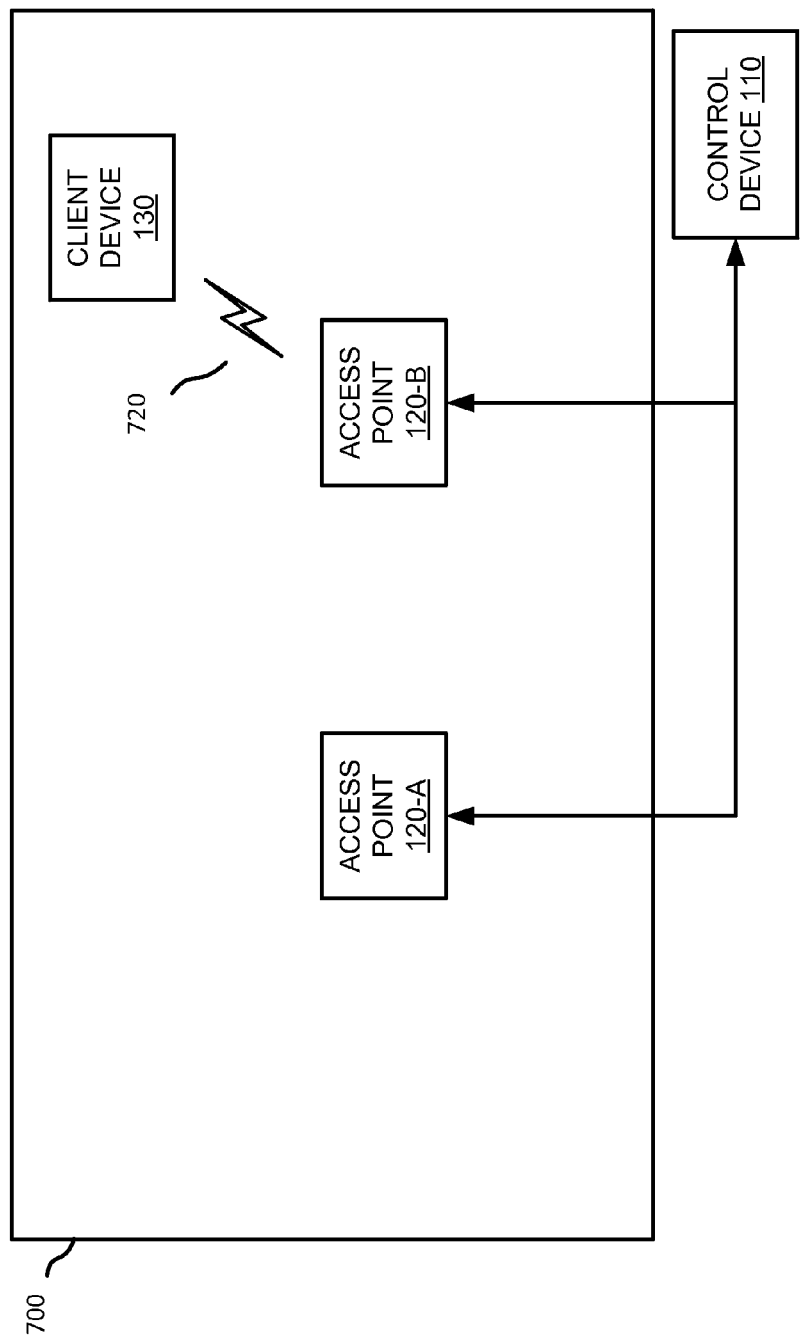

FIG. 9

| WAP IDENTIFIER 910 | STATUS 920 | RECENT ACTIVITY 930 | NUMBER OF CONNECTED CLIENTS 940 | PREFERENCE DATA 950 | REGION IDENTIFIER 960 |
|---|---|---|---|---|---|
| WAP 1 | ACTIVE | 140MB DOWNLOADED 12 MB UPLOADED | 6 CLIENT DEVICES | ALWAYS ACTIVE | REGION 1 |
| WAP 2 | INACTIVE (AVAILABLE) | NO ACTIVITY | 0 (ZERO) CLIENT DEVICES | ALWAYS ACTIVE MONDAY-FRIDAY | REGION 1 |
| WAP 3 | INACTIVE (NOT AVAILABLE) | NO ACTIVITY | 0 (ZERO) CLIENT DEVICES | NEVER ACTIVE SUNDAY | REGION 1 |
| ... | ... | ... | ... | ... | ... |

900

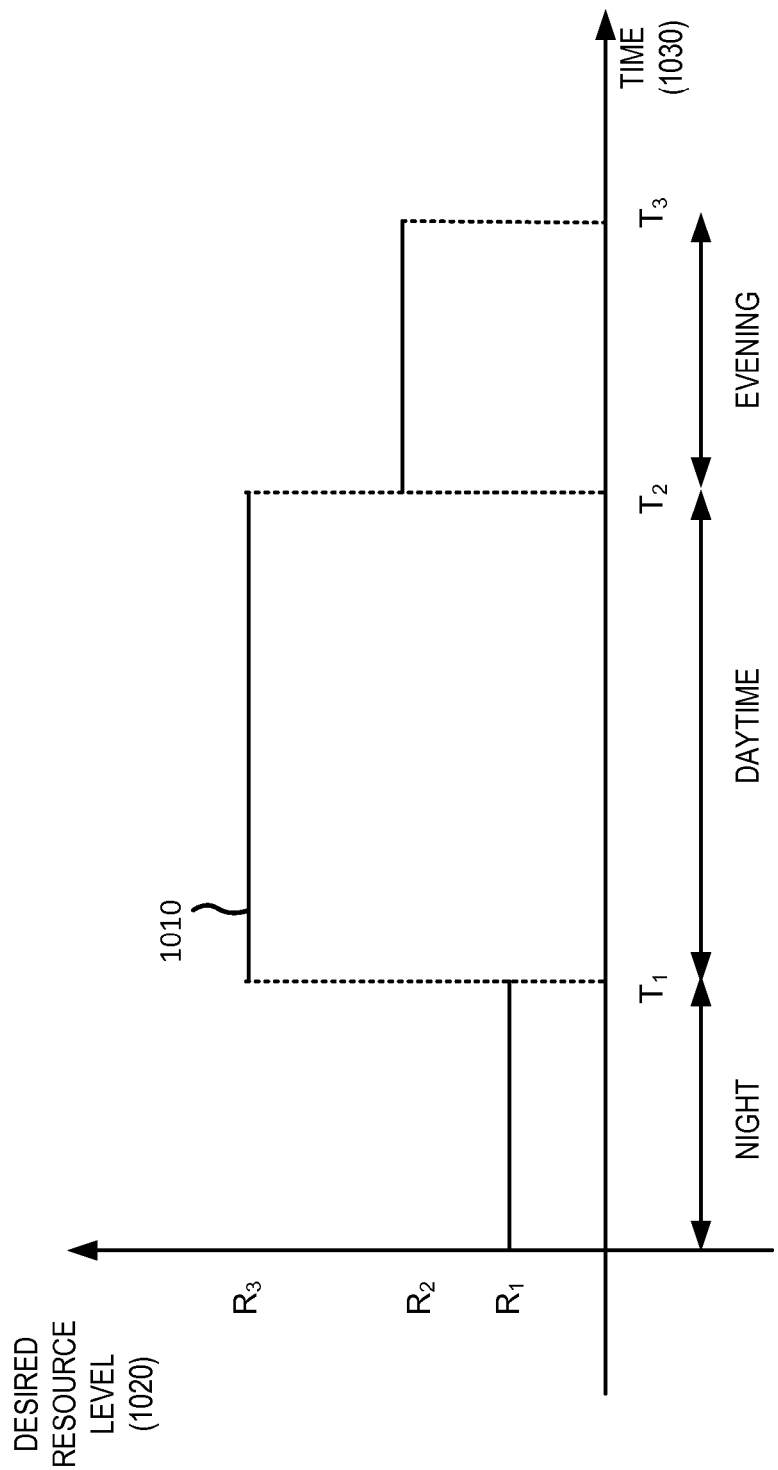

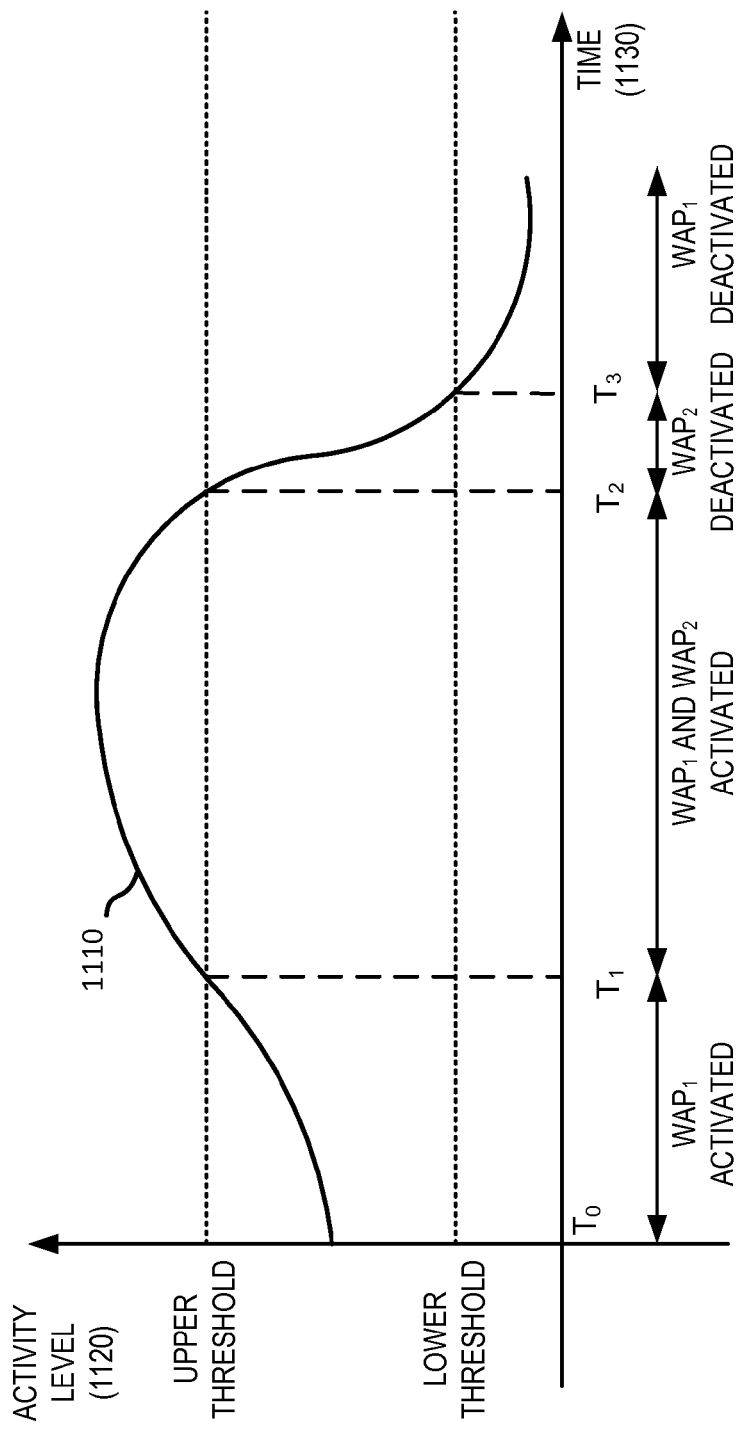

AUTOMATICALLY CONFIGURING WIRELESS NETWORKS

BACKGROUND

Wireless access points (WAPs) may be used to enable client devices to access a data network via a short-range wireless network, such as wireless local area network (WLAN). The WAPs may allow the client devices to access the data network without clients having a wired connection to the network. WAPs may be used inside and outside a building to provide access to the data network with minimum costs and construction. Furthermore, additional bandwidth and services may be provided by installing additional WAPs within the building or the covered area outside of the building. Typically, WAPs deployed in an environment, like an office, are powered at all times even when the WAPs are not in communication with client devices, therefore causing power to be wasted.

BRIEF DESCRIPTION OF THE DRAWINGS

FIGS. 7A-7E and 8 are diagrams that illustrate an example implementation of dynamically managing WAPs in the environment of FIG. 1;

FIG. 9 illustrates an exemplary status record that may be stored by control device 110 in connection with monitoring and controlling WAPs in the environment of FIG. 1;

FIG. 10 is an example graph that shows resources levels that are desired at different times; and FIG. 11 is an example graph that shows activity levels that are measured at different times.

DETAILED DESCRIPTION OF PREFERRED EMBODIMENTS

The following detailed description refers to the accompanying drawings. The same reference numbers in different drawings may identify the same or similar elements.

In an embodiment discussed herein, a controller may store preference information related to an initial configuration of a wireless access point (WAP). Based on the preference information, the controller may initially activate or deactivate the WAP when forming a wireless local network (WLAN). Activity on the WLAN is monitored and operation of the WAP may be modified based on the monitoring of the WLAN. For example, the controller may monitor an activity level associated with an active group of WAPs associated with the WLAN and may compare the activity level to a threshold. The controller may activate the WAP (when inactive) if the activity level is above an upper threshold, and the controller may deactivate the WAP (when active) if the activity level is below a lower threshold. In this way, the operation of the WAP may be dynamically controlled by the controller with minimal user involvement.

The WAPs referred to in this document may include a first network component to provide an air or radio interface for the clients and encompasses the wireless receiver and transmitter, and a second network component to provide connectivity to the data network by usage of either a wired network interface or in using a second air radio interface establishing data connection to some other WAP. WAPs with a wired network connection may either get the client air radio interface switched off by specific circuit design to reduce consumed power or a power source may be switched off externally. Deactivation of WAPs with a wired network connection may include one or more of these actions. WAPs without wired network connection may include circuitry that allows the client air radio to be switched off separately to reduce consumed power, and deactivation of WAPs without wired network connection may include switching off the client air radio. As used herein, activating a WAP may include, for example, turning the client air radio on by switching on circuitry of the radio and/or enabling power to the WAP.

Figure 1:
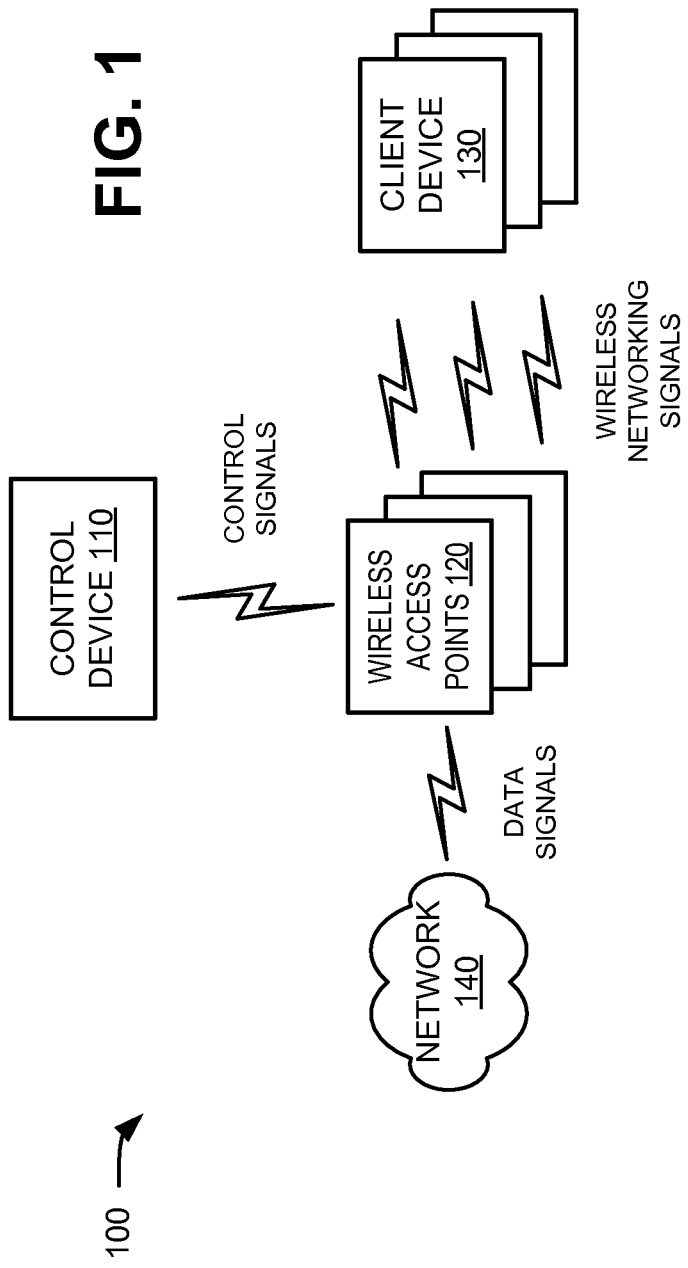
FIG. 1 is a diagram that illustrates an example environment in which systems and/or methods, described herein, may be implemented.

FIG. 1 is a diagram that illustrates an exemplary environment 100 in which systems and/or methods, described herein, may be implemented in one implementation. As shown in FIG. 1, environment 100 may include, for example, control device 110 that communicates with WAPs 120 that provide client devices 130 with access to network 140.

Control device 110 may include any type of computing device that is capable of communicating with and providing control signals to WAP 120. For example, control device 110 may direct WAP 120 to activate (e.g., turn on), to shut down, to change mode of operation, etc. Control device 110 may form the control signals based on, for example, status information associated with WAP 120, preferences received from a user, and/or decision rules.

Control device 110 may include an interface (e.g., a graphical user interface, or GUI) that enables a user to provide preference information and or decision rules associated with forming the control signals. For example, a user may specify a default desired times of active operation associated with WAP 120 (e.g., designating a first WAP 120 to be activated at all times and designating a second WAP 120 to be deactivated during certain times, such as non-business hours). In another instance, the user may specify a condition for activating a deactivated WAP 120. For example, control device 110 may send control signals to activate the second WAP 120 during non-business hours if a client device 130 is near (i.e., less than a threshold distance from) the second WAP 120, if first WAP 120 fails, if more than a threshold number of client devices 130 connect to the first WAP 120, or if more than a threshold amount of data is being handled by the first WAP 120, etc.

Control device 110 may be positioned near a WAP 120 (e.g., at a common location). For example, control device 110 may communicate with the WAP 120 via a wired or wireless interface (e.g., the same wireless interface being used by the particular WAP 120 to communicate with one or more client devices 130). In one implementation, control device 110 may be coupled to the particular WAP 120. For example, control device 110 may forward control signals to the particular WAP 120 and, in turn, the particular WAP 120 may forward the control signals to another WAP 120.

In another implementation, control device 110 may be positioned remotely from WAPs 120. For example, control device 110 may communicate with WAPs 120 via network 140 and/or another type of data or communications network. Control device 110 may forward control signals to a particular WAP 120 via the network, and the particular WAP 120 may forward the control information to another WAP 120.

WAPs 120 may include any network device that can provide wireless communications with client devices 130 to enable client device 130 to access network 140. WAPs 120 can be, for example, a router, modem, bridge, hub, or other type of network device that acts as a wireless access point. For example, WAPs 120 can forward data, such as web pages and email, between client devices 130 and network 140. In one implementation, WAPs 120 may include software that can enable WAPs 120 to communicate with control device 110 to receive instructions signals.

WAPs 120 may be split into a first device that provides wired network signals and power to a second device providing a wireless interface.

Additionally, WAPs 120 may determine and/or provide status information to control device 110. For example, WAPs 120 may measure proximity (e.g., a measurable distance) between WAP 120 and client device 130. For example, WAPs 120 can transmit and receive radio signals, where radio signal strength from client device 130 can correspond to, or be a function of, a distance between WAP 120 and client device 130. WAPs 120 may further measure, for example, upstream bandwidth and/or downstream bandwidth between client devices 130 and network 140.

Client devices 130 may include any portable device capable of communicating wirelessly with network 140. For example, client devices 130 may correspond to a mobile communication device (e.g., a mobile phone or a personal digital assistant (PDA)), a portable computer device (e.g., a laptop or a tablet computer), a stationary device (e.g., a desktop with a wireless adapter, a set top box, or a network streaming player), or another type of wireless network-capable device.

Network 140 may include any network or combination of networks such as, e.g., a data network accessed via a short range wireless network. In one implementation, network 140 may include one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). Alternatively or in addition, network 140 may include a contents delivery network having multiple nodes that exchange data with client devices 130. Although shown as a single element in FIG. 1, network 140 may include a number of separate networks that function to provide communications and/or services to client devices 130.

Although FIG. 1 shows exemplary components of environment 100, in other implementations, environment 100 may include fewer components, different components, differently arranged components, or additional components than those depicted in FIG. 1. As an example, in some implementations, environment 100 may include one or more intermediate devices, such as a router, firewall, etc. (not depicted), that connect WAP 120 to network 140.

Furthermore, it should be appreciated that tasks described as being performed by two or more other components of environment 100 may be performed by a single component, and tasks described as being performed by a single component of environment 100 may be performed by two or more components. For example, in a one implementation, control device 110 may be included in a particular WAP 120 (e.g., the functions associated with control device 110 may be performed by the particular WAP 120).

Figure 2:
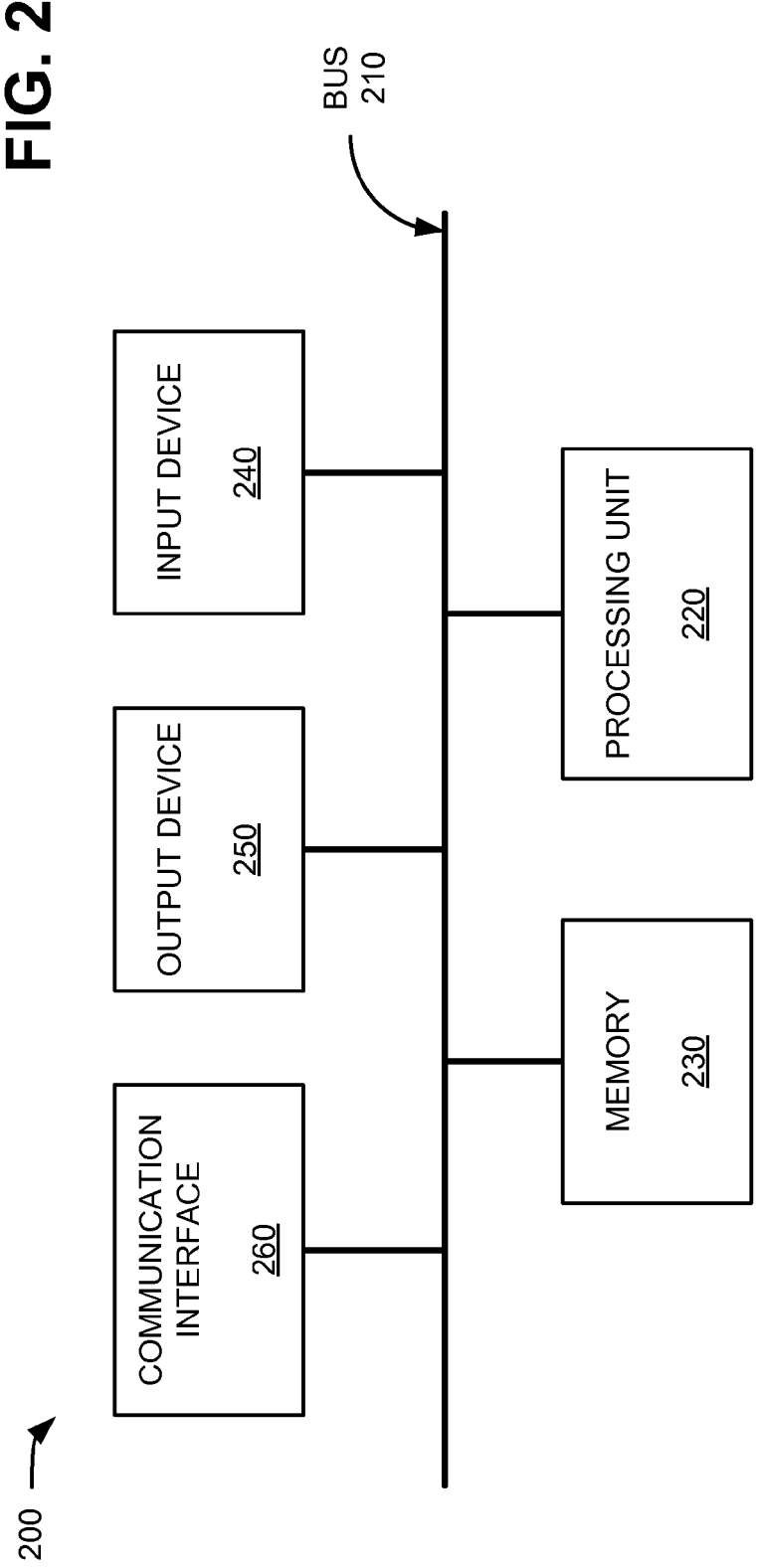
FIG. 2 is a diagram of example components of a computing device in the environment of FIG. 1.

FIG. 2 is a diagram of exemplary components of a device 200 in one implementation that may correspond, for example, to control device 110 and/or client device 130. One or more of components included in environment 100 may be implemented and/or installed as software, hardware, or a combination of hardware and software, on one or more of device 200. In one implementation, device 200 may be configured as a network device. In another implementation, device 200 may be configured as a computing device. As shown in FIG. 2, device 200 may include, for example, a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), and/or the like.

Memory 230 may include a random access memory (RAM) or another type of dynamic storage device that stores information and instructions for execution by processing unit 220, a read only memory (ROM), electrical erasable permanent memory (Flash) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of environment 100.

As described herein, device 200 may perform certain operations in response to processing unit 220 executing software instructions contained in a computer-readable medium, such as memory 230. A computer-readable medium may include a tangible, non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than those depicted in FIG. 2. As an example, in some implementations, device 200 may include a sensor or other type of device to monitor a status of a WLAN established between WAPs 120 and client device 130. Furthermore, it should be appreciated that tasks described as being performed by two or more other components of device 200 may be performed by a single component, and tasks described as being performed by a single component of device 200 may be performed by two or more components.

Figure 3:
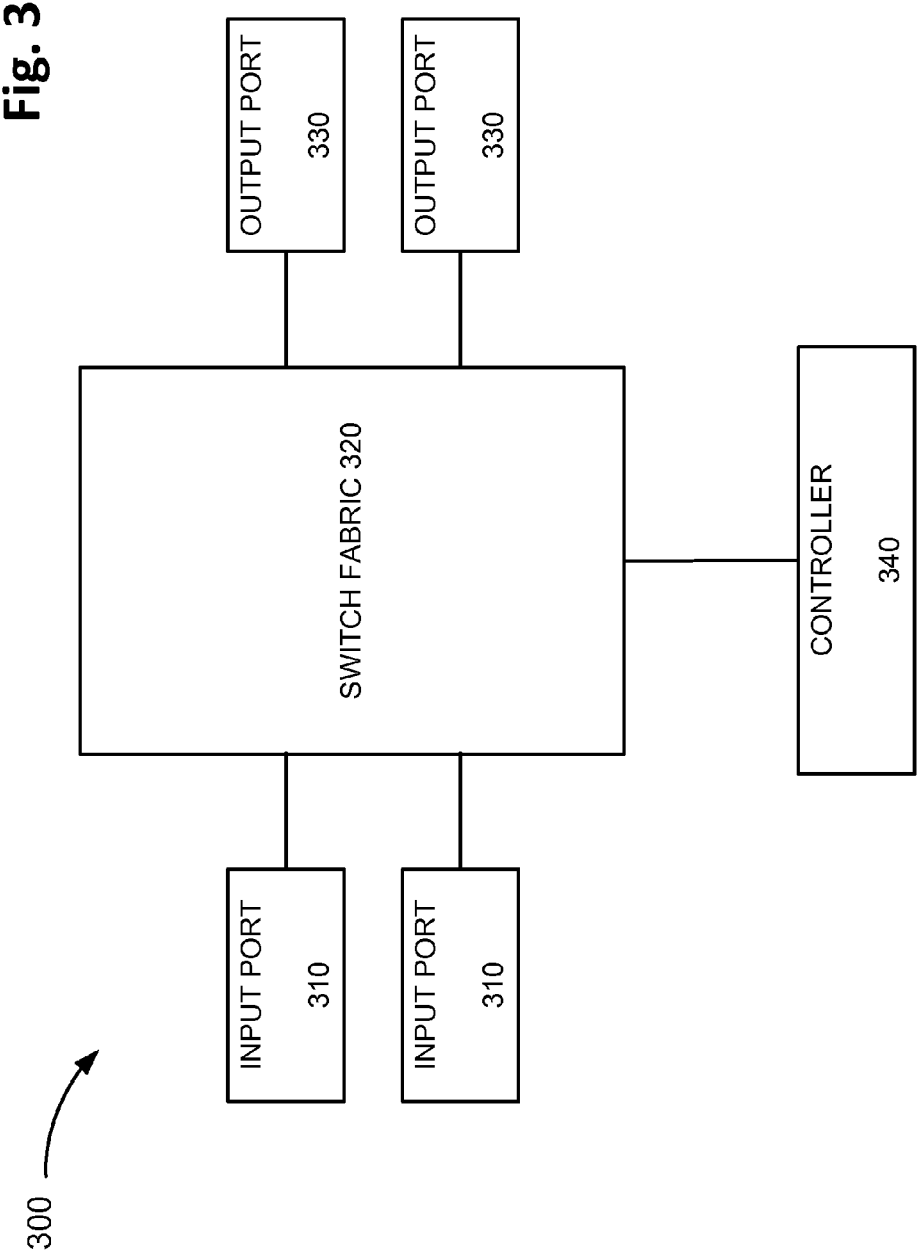
FIG. 3 is a diagram of example components of a wireless access point (WAP) within the environment of FIG. 1.

FIG. 3 is a diagram of components of an exemplary device 300 in one implementation that may correspond to WAP 120.

Device 300 may include, for example, one or more input ports 310, switch fabric 320, one or more output ports 330, and controller 340.

Input ports 310 may be a point of entry for incoming traffic, such as data packets. Input ports 310 may process incoming wired or wireless traffic. Switch fabric 320 may interconnect input ports 310 with output ports 330. Switch fabric 320 may act, for example, as temporary buffers to store traffic from input ports 310 before the traffic is eventually scheduled for delivery to output ports 330. Output ports 330 may store packets and may schedule packets for service on output links. Output ports 330 may further process traffic to be outputted to network 140 and/or client devices 130. Input ports 310 and/or output ports 330 may include, for example, a radio-frequency (RF) transmitter for exchanging wireless signals with client devices 130.

Controller 340 may use routing protocols and/or one or more forwarding tables for forwarding packets. Controller 340 may connect with input ports 310, switch fabric 320, and output ports 330. Controller 340 may include memory to store information, such as information entered during set up (e.g., instructions signals previously provided by control device 110) or operation conditions associated with one or more other WAPs 120. Controller 340 may exchange signals from another WAP 120 and/or client device 130 and determine a status of the other WAP 120. For example, controller 340 may receive status information from the other WAP 120. In addition or alternatively, controller 340 may dynamically determine status information associated with the other WAP 120. For example, controller 340 may determine that the other WAP 120 is active when the other WAP 120 is exchanging data signals, and controller 340 may determine an amount of data being provided via the detected signals. Controller 340 may determine status of a client device 130 based on signals detected from the client device 130. For example, controller 340 may determine, for example, a number of client devices 130 within an area and determine the proximity of each such client device 130 to the controller based on strengths of the connection requests and/or other signals received from each such client device 130.

In one implementation, activating device 300 may include, for example, providing instructions to controller 340 to provide power to input ports 310 and output ports 330, and deactivating device 300 may include, for example, providing instructions to controller 340 to cease power to one or more input ports 310 or output ports 330. For example, input ports 310 and output ports 330 may be included in a component that provides a wireless, air interface to client devices 130, and controller 340 may deactivate device 300 by directing input ports 310 and output ports 330 to stop providing the air interface to client device 130. Input ports 310 and output ports 330 may be part of another component that provides an air interface to network 140, and controller 340 may also deactivate device 300 by directing input ports 310 and output ports 330 to stop providing the air interface to network 140.

In another one implementation, input ports 310 and output ports 330 may be part of a first component that provides an air interface to client devices 130 and a second component that provides a wired interface to network 140. Controller 340 may deactivate device 300 by directing input ports 310 and output ports 330 to stop providing the air interface to client devices 130 while maintaining the wired connection to network 140. Thus, device 300 may continue to receive/transmit data to network 140 while the air connection to client devices 130 is turned off. Device 300 may buffer data received from network 140 for later transmission to client devices 130.

Although FIG. 3 shows example components of device 300, in other implementations, 300 may include fewer components, different components, differently arranged components, or additional components than those depicted in FIG. 3. For example, device 300 may include components to register client devices 130, to verify instructions received from controller 110, and to encode/decode data for transmission via a WLAN between WAP 120 and client devices 130. Furthermore, it should be appreciated that tasks described as being performed by two or more other components of device 300 may be performed by a single component, and tasks described as being performed by a single component of device 300 may be performed by two or more components.

Figure 4:
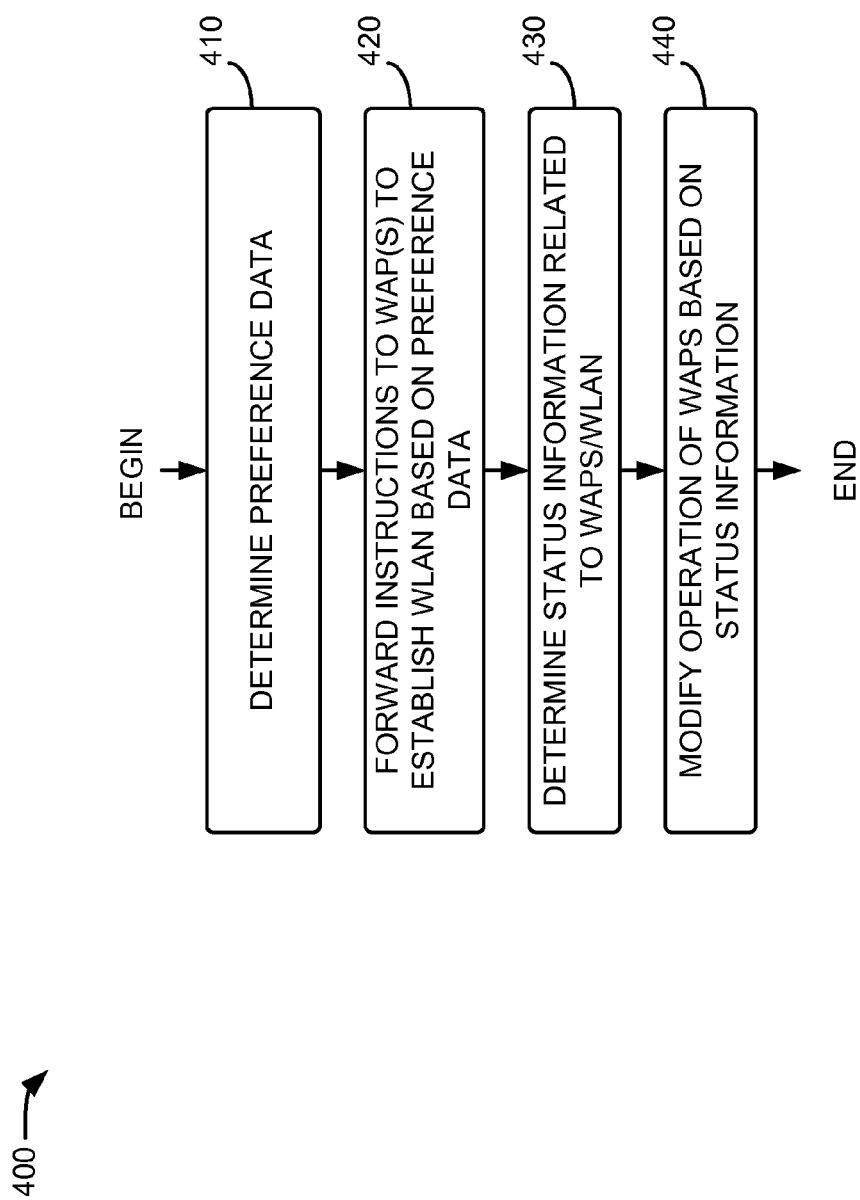
FIGS. 4-6 are flowcharts of an example process to dynamically manage WAPs in the environment of FIG. 1.

FIG. 4 is a flow diagram of an exemplary process 400 for dynamically managing WAPs 120. In one implementation, process 400 may be performed by control device 110. In other implementations, process 400 may be performed using control device 110 and one or more other devices.

Process 400 may include determining preference data (block 410). Control device 110 may store default preferences. For example, the default preference data may indicate that all WAPs 120 should be initially deactivated absent other conditions or factors, such as receiving a request from a client device 130 for data or receiving instructions from network 140 to push data to a client device 130. In another implementation, the default preferences may indicate, for example, to initially activate a subset (i.e., fewer than all) of WAPs 120. For example, the preference data may indicate that a particular WAP 120 should be initially activated. The default preferences may also indicate, for example, to initially activate all of WAPs 120.

Control device 110 may further determine the preference data based on prior activity by WAPs 120. In one implementation, the preference data may indicate that a particular number of WAPs 120 should be initially activated based on previous usage patterns associated with the WAPs 120. For example, the preference data may indicate that a first, larger number of WAPs 120 is activated when high levels of activity (e.g., a large number of data requests are received from client device 130) are expected and a second, smaller number of WAPs 120 is activated when low levels of activity are expected.

To determine prior activity by WAPs 120, control device 110 may review data exchanges between WAPs 120 and client devices 130 to identify, for example, a number of client devices 130 connected to different WAPs 120 and/or bandwidths of signals passing through WAPs 120 at different times. A number of client devices 130 connected via a WLAN and a quantity of data provided to the client device 130 via the WLAN may vary during the day. For example, the number of client devices 130 connected via the WLAN in an office and the amount of data exchanged through the WLAN is typically higher during work hours than during non-work hours. Control device 110 may determine the prior activity information based, for example, on transaction records, or log files, stored in WAPs 120 to identify data exchanges with client devices 130. Control device 110 may examine the transaction records to determine for example, activities levels for each of the WAPs 120 at different times.

In one implementation, control device 110 may predict expected usages of WAPs 120 based on analyzing prior usages and may determine the preference data in block 410 based on the expected usages. For example, control device 110 may use various statistical techniques, such as Markov chains, to identify patterns in the prior usages of WAPs 120 and may use these patterns to predict future usages of WAPs 120.

In another implementation, control device 110 may predict expected levels of usage of WAPs 120 based on other factors. For example, control device 110 may determine the presence of client devices 130 and/or related users and use this information to predict usage of WAPs 120. Control device 110 may determine the presence of a user and/or an associated client device 130 based on, for example, feedback from a detector indicating the user's presence (e.g., a motion or proximity detector); the user submitting information for security (e.g., the user entering a security code and/or using a security card to access an area at work), the user using resources (e.g., using an elevator and/or turning on lights), the user activating client device 130, etc.

In block 410, control device 110 may also determine the preference data at least partially based on a user input. For example, control device 110 may further provide an interface that allows a user associated with control device 110, WAPs 120, and/or client devices 130 to specify one or more conditions. For example, control device 110 may provide a GUI or other interface to receive preference data from the user. The user may use the interface to identify a particular WAP 120 and/or specify a configuration for the particular WAP 120. For example, the user may provide an input to control device 110 via the interface, and control device 110 may determine the preference data based on the input (e.g., the interface may provide a representation of the WAPs 120, and the user may submit data specifying a particular WAP 120).

In one implementation, determining preference data in block 410 may include identifying desired performance aspects associated with the WAPs 120. The preference data may indicate, for example, a minimum or maximum number of WAPs that should be operating at a time, a number of ports active in each of the WAPs, a desired amount of available bandwidth, etc. The preference data may further identify performance rules for configuring the WAPs 120. For example, the preference data may identify a minimum spacing between different active WAPs 120 to minimize interference between the active WAPs 120 and/or may indicate that adjacent WAPs 120 should be configured to use different frequencies and/or transmission formats to minimize that interference.

The preference data determined in step 410 may further identify, for example, types of client devices 130 that may cause controller 110 to change the operation status of a particular WAP 120. For example, the preference data may indicate that certain types of devices (e.g., work-related devices in an office or education-related devices in a school are prioritized over personal devices). In this example, controller 110 may instruct the particular WAP 120 to enable connections with only certain types of client devices 130 at certain times (e.g., no connections to personal devices allowed during non-business hours) and/or to prioritize data transmission to the certain types of client devices 130.

FIG. 10 shows an exemplary resource level graph 1010 that may be identified in block 410. Resource level graph 1010 may identify resources levels 1020 that are desired at different times 1030. For example, a first, low resource level $R_1$ may be desired at night (e.g., between 11 PM and 9 AM), a second, high resources level $R_2$ may be desired during the daytime (e.g., between 9 AM and 6 PM), and a third, middle resources level $R_3$ may be desired during the evening (e.g., between 6 PM and 11 PM). Controller 110 may use the resource level graph 1010 to identify WAPs 120 to activate at a time. For example, controller 110 may select quantities of WAPs 120 to activate in order to provide the desired resource levels 1020 at times 1030.

Continuing with process 400 shown in FIG. 4, control device 110 may forward instructions to WAPs 120 to establish a WLAN based on the preference data (block 420). For example, control device 110 may identify a group (i.e., less than all) of WAPs 120 to activate and another group WAPs 120 to deactivate. The activated group WAPs 120 forms the WLAN.

Figure 5:
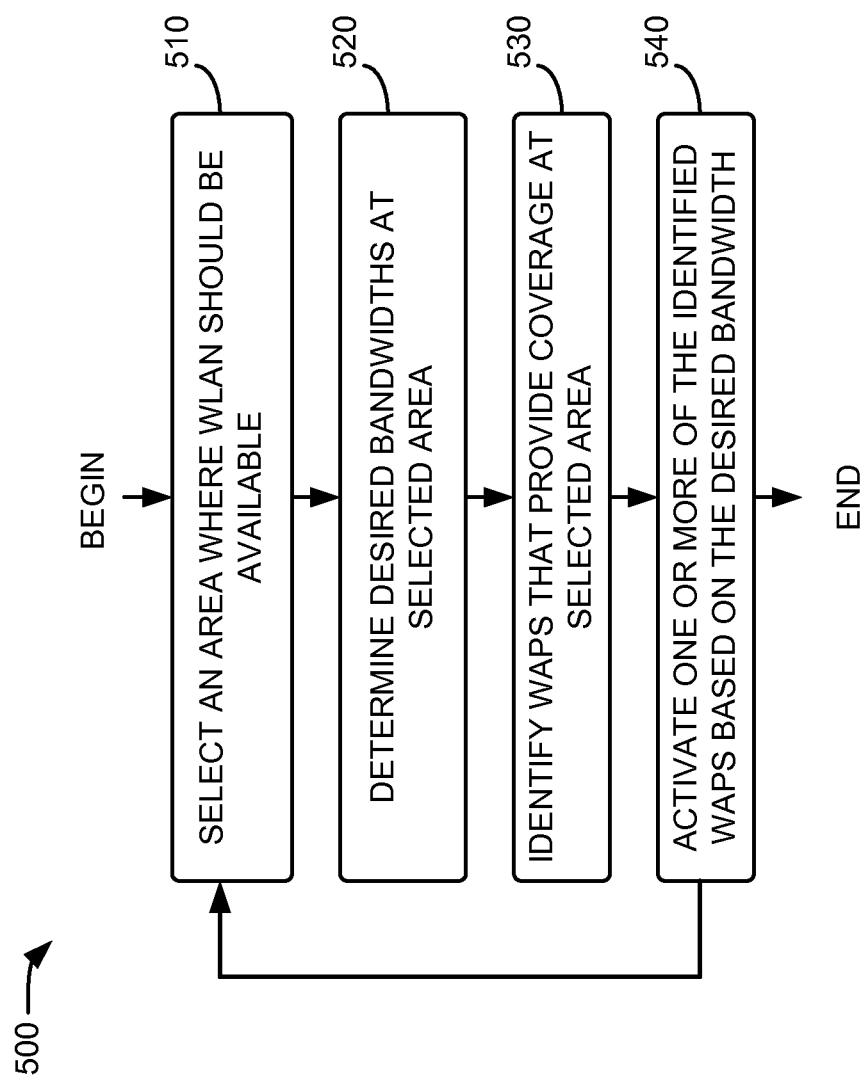

Turning now to FIG. 5, before continuing with the remaining discussion of FIG. 4, FIG. 5 is a flow diagram of an exemplary process 500 for establishing a WLAN based on the preference data identified in block 420. In one implementation, process 500 may be performed by control device 110. In other implementations, process 500 may be performed using control device 110 and one or more other devices.

Process 500 may include control device 110 selecting an area based on the preference data (block 510) and determining a desired bandwidth for the selected area (block 520). Control device 110 may identify, based on the preference data determined in block 410, an area where access to network 140 is to be provided to client devices 130 and a desired bandwidth based on a number of, or an expected number of, client devices 130 located near the selected area. In a situation in which control device 110 is managing WAPs located at a workplace, control device 110 may determine, for example, portions of the workplace where employees are present at different times, and estimate a number of employees expected to be present at those portions of the workplace at the different times. For example, control device 110 may determine that WAPs 120 should be activated so that client device 130 may access network 140 via a WLAN of high bandwidth throughout the workplace during business hours, but only a subset of WAPs 120 should be activated at other times. Because only a subset of WAPs 120 is activated, a lower level of bandwidth as available via the WLAN and/or the WLAN only covers a portion of the workplace during the other times.

In a situation in which control device 110 is configuring the WLAN in a workplace during non-business hours, control device 110 may activate WAPs 120 located at, for example, an entrance of the workplace to identify when a client device 130 enters the workplace and/or at a location of the workplace associated with employees that work during non-business hours. Continuing with this example of configuring a workplace, control device 110 may estimate a number of client devices 130 accessing the WLAN at different times, and determine a corresponding bandwidth available to the estimated number of client devices 130.

Control device 110 may identify WAPs 120 associated with the selected locations (block 530). In block 530, control device 110 may identify WAPs 120 capable of communicating with client devices 130 located at the selected location via a short-range telecommunications signals associated with the WLAN. Control device 110 may receive position information from WAPs 120. For example, control device 110 may receive geographic data from the WAPs 120 (e.g., information associated with global positioning service (GPS) signals) and/or data identifying other devices (e.g., an edge router associated with network 140) that communicates with WAPs 120 and the locations of these other devices. Based on information about client signal strength received by WAPs 120 location information relative to the locations of the WAPs 120 could be calculated using trilateration and/or triangulation by control device 110. Information about the locations of the WAPs 120 may also be determined based on, for example, configuration data received from a user (e.g., via an interface).

Control device 110 may also infer a location associated with a particular WAP 120 based on locations associated with client devices 130 communicating with the particular WAP 120. For example, control device 110 may determine the locations of client devices 130 based on geographic data (e.g., GPS signals) received from client devices and/or signals received from other devices in communications with the client devices 130 (e.g., signals from a base tower communicating with a wireless client device 130).

In one implementation, WAPs 120 may be identified in block 530 further based on preference data. For example, as described above with respect to block 410, the preference data may indicate a minimum number of active WAPs 120, a maximum number of active WAPs 120, and/or spacing rules regarding distances between active WAPs 120, and one or more WAPs 120 may be identified in block 530 based on these criteria.

Control device 110 may activate one or more of the identified WAPs 120 based on the desired bandwidths (block 540). For example, control device 110 may identify a selected number of WAPs 120 to use to provide the desired bandwidths identified in block 520 and activate the selected number of WAPs 120 by forwarding instructions to activate the selected number of WAPs 120 and/or to deactivate non-selected WAPs 120. For example, each of the WAPs associated with a location may handle a particular bandwidth, and a sufficient number of the WAPs associated with the location may be selected by control device 110 to enable a desired total bandwidth. In a situation in which fewer than all of the WAPs 120 at a location are needed to provide a desired bandwidth, control device 110 may select a subset of the WAPs 120 based on, for example, the preference data received in block 410 or other technique, such as a round-robin or random basis.

Returning to process 400 in FIG. 4, control device 110 may determine status information related to WAPs 120 and/or the WLAN (block 430). For example, control device 110 may determine when a client device 130 makes a connection request to WAP 120, an operating status of the WAPs 120 (e.g., to determine whether each of the WAPs 120 is operational and/or communicating with network 140), an amount of data being exchanged via the active WAPs 120, etc. Control device 110 may receive this information based on, for example, status signals received from WAPs 120 and/or from another device (e.g., such as an edge router associated with network 140). For example, control device 110 may ping WAPs 120 and evaluate responses to the ping request to determine the operating status of the WAPs 120.

Control device 110 may also dynamically determine this information based on monitoring communications between WAPs 120 and network 140. For example, control device 110 may determine an amount of data being transmitting in communications between WAPs 120 and network 140, and control device 110 use this information to determine the status of the WAPs 120 and/or a WLAN connecting the WAPs 120 and client devices 130. For example, control device 110 may determine that a particular WAP 120 is active and connected to at least one client device 130 when data is being transmitted from the particular WAP 120. In one implementation, control device 110 may send pseudo-traffic, such as a test packet, to client devices 130 via the particular WAP 120 to determine a number of client devices 130 connected to the particular WAP 120.

The control device 110 may dynamically adjust the operation of the WAPs 120 based on the status information collected in block 430 (block 440). For example, control device 110 may determine whether an insufficient number of WAPs 120 is active and, if so, forward instructions to activate additional WAPs and/or control device 110 may determine that an excessive number of WAPs 120 is active and, if so, forward instructions to deactivate one or more of the active WAPs 120.

Control device 110 may identify client devices 130 that are using a particular WAP 120 to be deactivated, and may initiate signaling towards the identified client devices 130. The signaling may cause the identified client devices 130 attempt to connect to another WAP 120 or otherwise cease using the particular WAP 120 (e.g., shut down). Once control device 100 determines that less than a threshold number (e.g., zero) client devices 130 are using the particular WAP 120, control device 100 may forward instructions to shut down the particular WAP 120 as needed.

Figure 6:
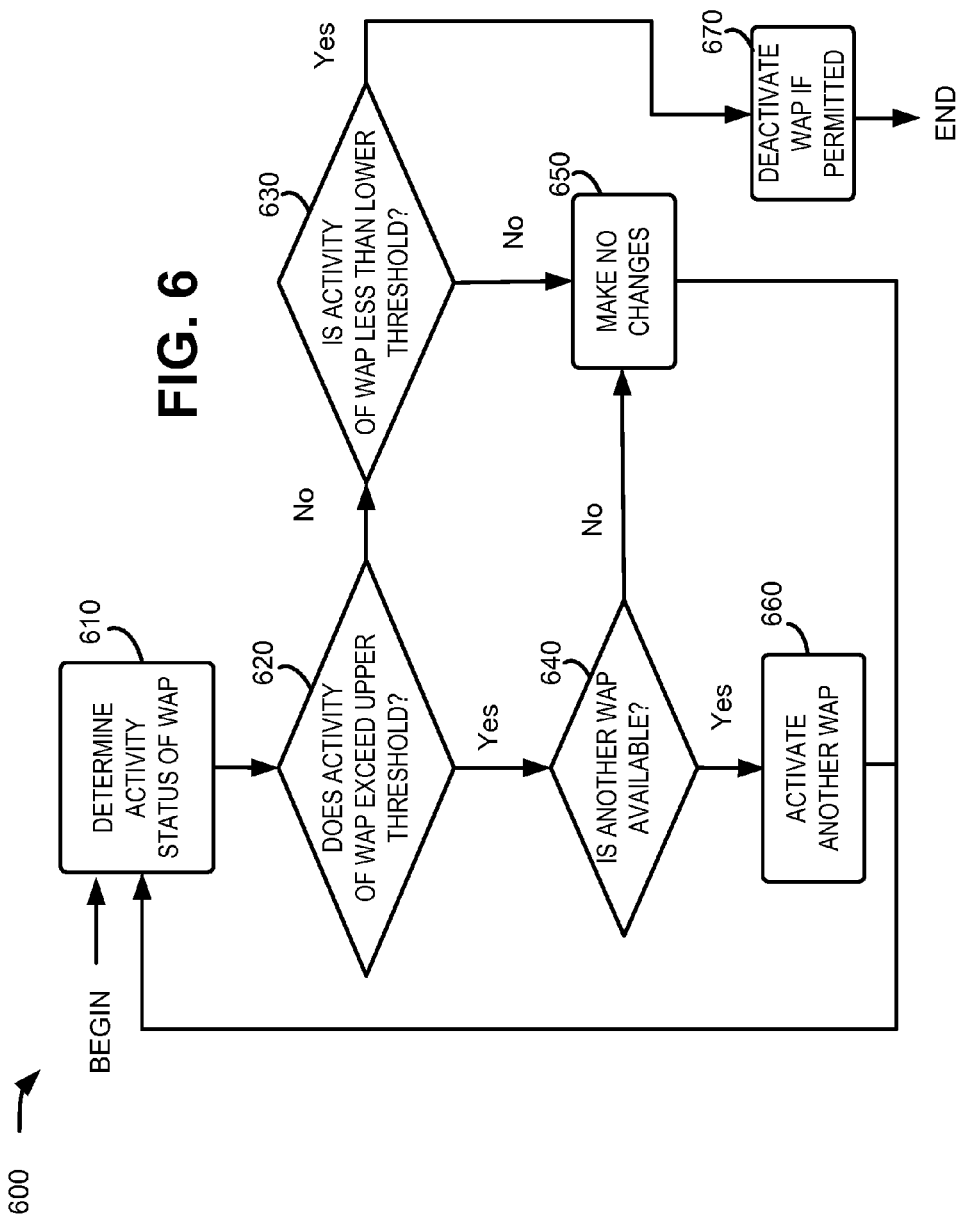

FIG. 6 is a flow diagram of an exemplary process 600 for dynamically adjusting the operation of a particular WAP 120 based on the status information in block 440. In one implementation, process 600 may be performed by control device 110. In other implementations, process 600 may be performed using control device 110 and one or more other devices.

Process 600 may include control device 110 determining a current activity of the particular WAP 120 (block 610). For example, control device 110 may determine whether the particular WAP 120 is active and, if so, determine a number of client devices 130 connected to the particular WAP 120 and/or an amount of data being exchanged via the particular WAP 120. Control device 110 may further determine a location associated with the particular WAP 120 (e.g., an area that receives short-range communications signals from the particular WAP 120) and a status of other WAPs 120 associated with the location. For example, control device 110 may identify whether another WAP 120 associated with the location is active and, if so, determine a number of client devices 130 connected to the other WAP 120 and/or an amount of data being exchanged from network 140 via the other WAP 120. In another implementation, activity levels determined in block 610 may relate to a number of input and/or output ports being used by an active WAP 120.

Continuing with process 600 in FIG. 6, control device 110 may determine whether the activity of the particular WAP 120 exceeds an upper threshold amount (block 620). For example, control device 110 may determine whether more than a first threshold number of client devices 130 are connected to the particular WAP 120 and/or whether more than a first threshold amount of data is being exchanged between WAP 120 and the connected client devices 130.

In one implementation of block 620, different upper thresholds may be defined for different types of client devices 130. For example, controller 110 managing WAPs 120 in an office may determine whether a number of work-related devices (or an amount of exchanged data) exceeds a first upper threshold and whether a number of personal devices (or the amount of exchanged data) exceeds a second, upper threshold.

If the activity of the particular WAP 120 does not exceed the upper threshold amount (block 620—No), control device 110 may determine whether the activity of the particular WAP 120 is less than a lower threshold amount (block 630). For example, control device 110 may determine whether fewer than a second threshold number of client devices 130 are connected to the particular WAP 120 and/or whether less than a second threshold amount of data is being transmitted between WAP 120 and the connected client devices 130.

In one implementation of block 630, different lower thresholds may be defined for different types of client devices 130. For example, controller 110 managing WAPs 120 in an office may determine whether a number of work-related devices (or amount of exchanged data by the work-related devices) is less than a first lower threshold and whether a number of personal devices (or amount of exchanged data by the personal devices) is less than a second lower threshold.

If the activity of the particular WAP 120 exceeds the upper threshold amount (block 620—No), control device 110 may determine whether another WAP 120 associated with a location associated with the particular WAP 120 is available (block 640). If the other WAP 120 associated with the location is available (block 640-Yes), control device 110 may forward instructions to the other WAP 120 to activate it to provide increased resources (block 660).

If the activity of the particular WAP 120 is not less than the lower threshold amount (block 630—No) [in combination with the activity of the particular WAP 120 not being greater than the threshold amount (block 620—No)], control device 110 may make no changes to the operation of WAPs 120 (block 650). Similarly, if the other WAP 120 is not available (block 640—No) [in combination with the activity of the particular WAP 120 being greater than the threshold amount (block 620-Yes)], control device 110 may make no changes to the operation of WAPs 120 (block 650). Control device 110 may determine that the other WAP 120 is not available in block 640 if, for example, no other WAPs 120 are associated with the location, the other WAPs 120 are not operating, the other WAPs 120 are already activated, etc.

If the other WAP 120 is available (block 640-Yes) [in combination with the activity of the particular WAP 120 being greater than the threshold amount (block 620-Yes)], control device 110 may send instructions to activate the other WAP 120 (block 660). If multiple other WAPs 120 are available, control device 110 may select one of the other WAPs 120 based on, for example, the preference data determined in block 410 or other technique, such as a round-robin or random basis.

If the activity of the particular WAP 120 is less than the lower threshold amount (block 630-Yes), control device 110 may forward instructions to deactivate the particular WAP 120 if deactivation of the particular WAP 120 is permitted (block 670). For example, control device 110 may determine whether the particular WAP 120 can be deactivated based on the preference data determined in block 410. In one implementation, control device 110 may determine that the WAP 120 may not be deactivated when the activity level is below the lower threshold level if, for example, coverage is desired at the location even when the activity is below the lower threshold.

FIG. 11 shows an exemplary activity level graph 1110 that provides different activity levels 1120 (e.g., a number of devices connected to active WAPs 120, a number of ports used by active WAPs 120, an amount of data being exchanged via active WAPs 120, etc.) at different times 1130. In activity level graph 1110 shown in FIG. 11, activity level 1120 is between upper and lower thresholds between times $T_0$ and $T_1$ and between times $T_2$ and $T_3$, so a first WAP 120 or a first group of WAPs 120 ($WAP_1$) may be active during these time periods. Activity level 1120 is above the upper threshold between times $T_1$ and $T_2$ (block 620-Yes), so a second WAP 120 or a second group of WAPs 120 ($WAP_2$) may be activated during this time period (block 660). Activity level 1120 is below the lower threshold between times $T_2$ and $T_3$ (block 630—Yes), so $WAP_1$ may be activated during this time period (block 670).

Figure 7A:
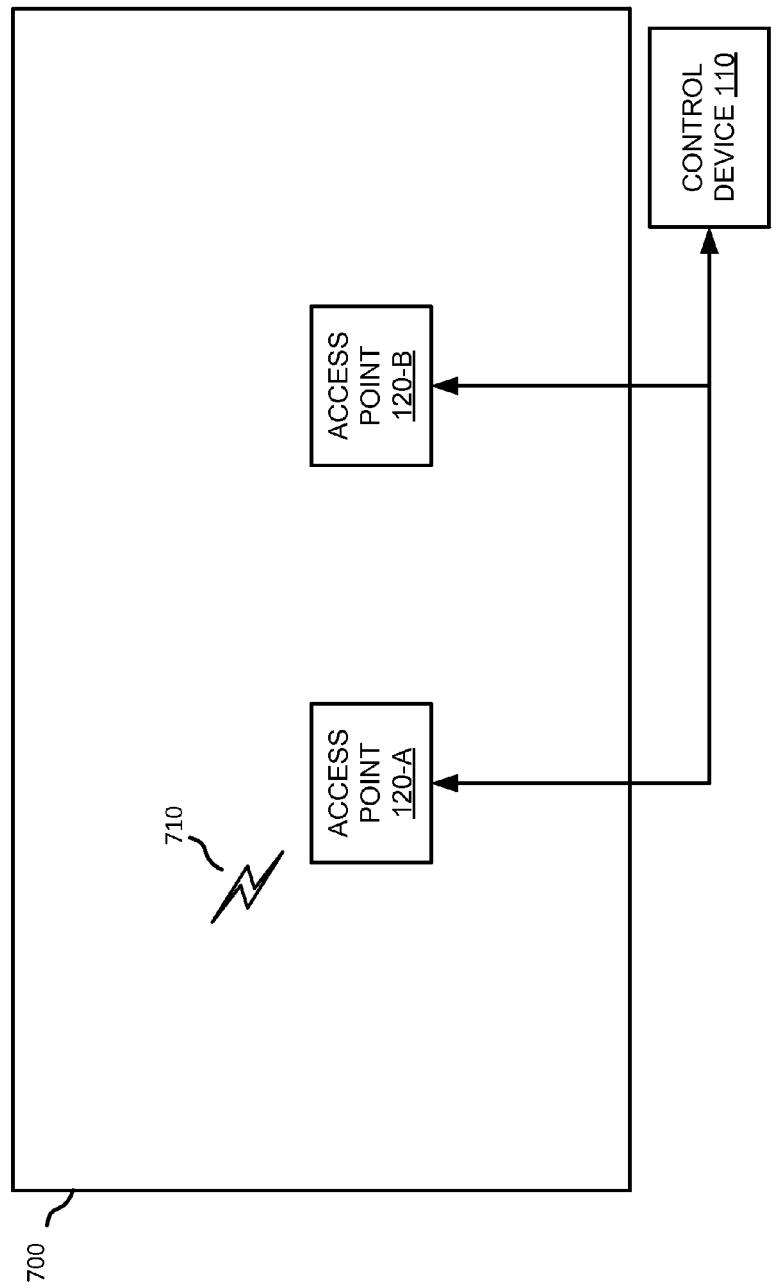

FIGS. 7A-7E depict an exemplary operation of control device 110 in one embodiment. In FIGS. 7A-7E, control device 110 may monitor and forward instructions to WAPs 120-A and 120-B that are associated with area 700. In FIG. 7A, control device 110 may initially activate WAP 120-A such that WAP 120-A may send and/or receive communications signals 710. For example, control device 110 may activate WAP 120-A (and not WAP-120-B) based on preference data associated with area 700.

Figure 7B:
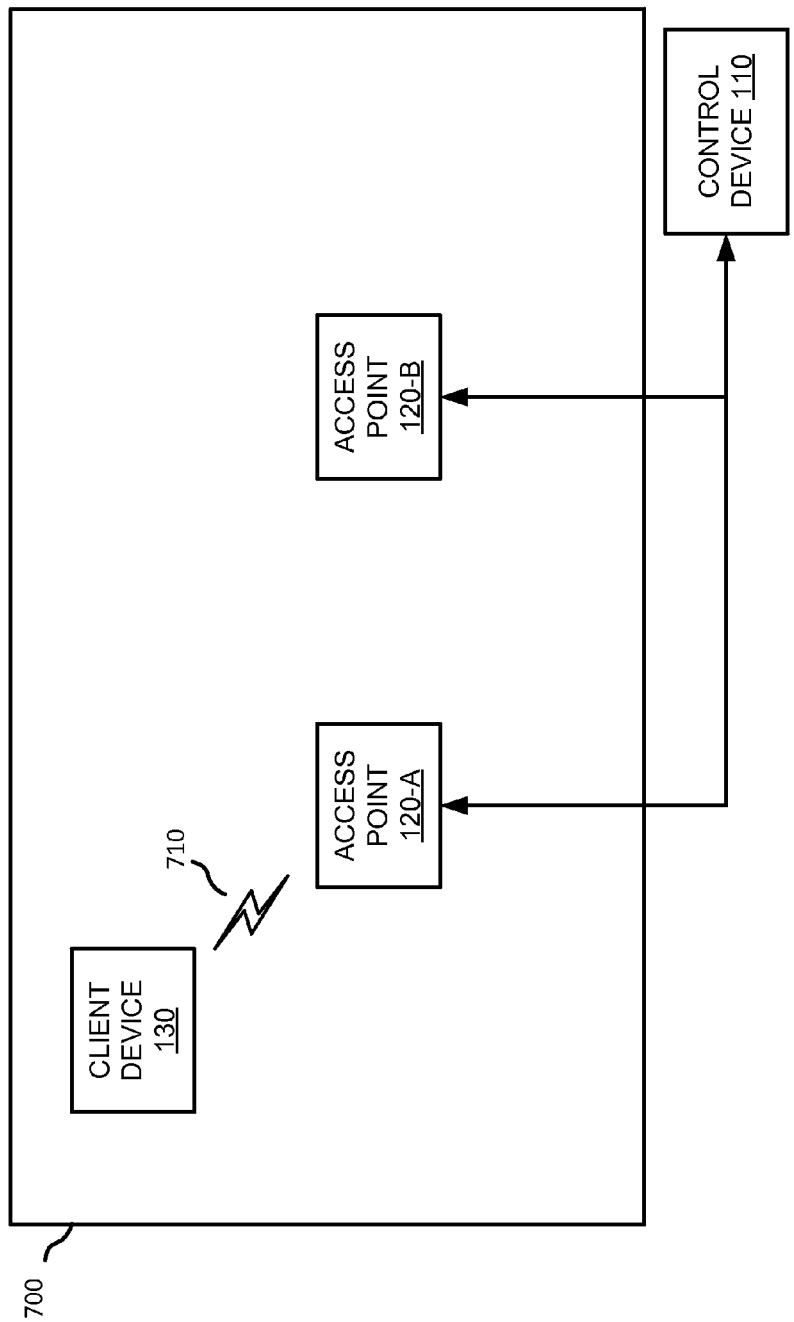

As shown in FIG. 7B, if client device 130 enters area 700, client device 130 may communicate with WAP 120-A via communications signals 710. For example, client device 130 may exchange signals with WAP 120-A to authenticate and register client device 130, to exchange data with network 140, etc. WAP 120-A may forward status information to control device 110 identifying, for example, that client device 130 is communicating with WAP 120-A and/or indicating an amount of data being transmitted between client device 130 and WAP 120-A. In this way, feedback data provided by WAP 120-A to control device 110 may be used to determine when client device 130 enters area 700 and/or is activated by a user.

In one implementation, controller 120 may modify an operation mode of WAPs 120. For example, controller 120 may initially direct WAP 120-A to operate in a low power mode such that WAP 120-A may receive communications (e.g., a connection request) from client device 130 but does not respond to the communications from client device 130. WAP 120-A may notify controller 110 of receiving the communications from client device 130, and Controller 110 may then direct WAP 120-A to enter a different operation mode. When in the different operation mode, WAP 120-A may respond to the communications from the client device 130. Alternatively, controller 110 may initially cause WAP 120-B to operate in a low power mode to receive communications from client device 130, and controller 110 may direct WAP 120-A to respond to the communications from the client device 130.

As shown in FIG. 7C, control device 110 may send instructions to WAP 120-B, or otherwise cause WAP 120-B to activate such that WAP 120-B may send and/or receive communications signals 720. Client device 130 may then communicate with WAP 120-B via communications signals 720 instead of or in addition to communicating with WAP 120-A via communications signals 710. Control device 110 may send instructions to WAP 120-B or otherwise cause WAP 120-B to activate. For example, control device 110 may active WAP 120-B if, for example, WAP 120-A is not available. WAP 120-A may be unavailable when WAP 120-A is correctly functioning. WAP 120-A may also not be available to connect to a client device 130 if WAP 120-A is already connecting to a maximum number of other client devices 130 and/or WAP 120-A is already transmitting maximum amount of data to the other client devices 130.

Figure 7D:
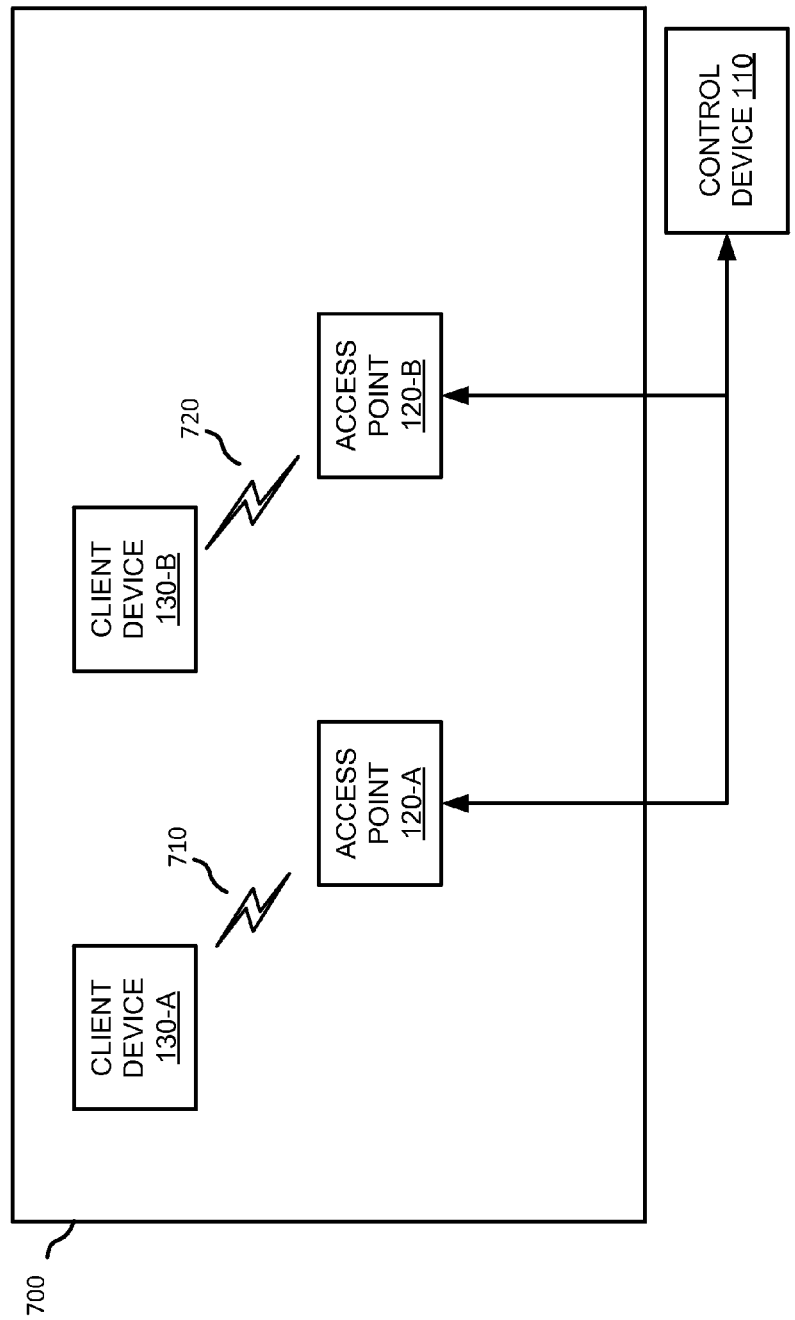

For example, as shown in FIG. 7D, if two client devices (or groups of client devices) 130-A and 130-B enter or are activated within area 700, control device 110 may cause WAP 120-A to become activated to handle client devices 130-A and cause WAP 120-B to become activated to handle client devices 130-B. For example, control device 110 may determine to activate WAP 120-B based on determining that WAP 120-A has insufficient available bandwidth to handle both client devices 130-A and client devices 130-B.

Figure 7E:
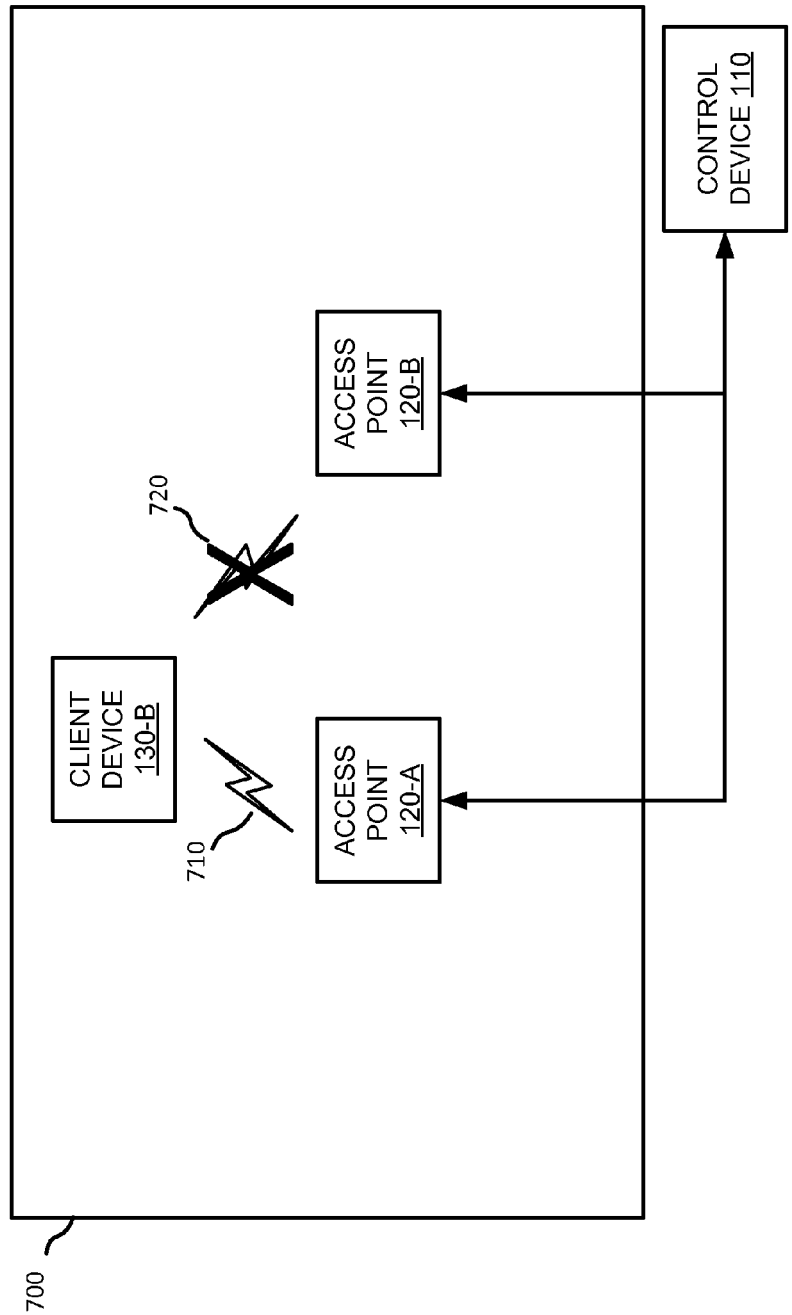

As shown in FIG. 7E, control device 110 may send instructions to deactivate WAP 120-B. For example, control device 110 may determine to deactivate WAP 120-B if an error is detected in WAP 120-B and/or an insufficient number of client devices 130 is present in area 700 (e.g., client devices 130-A move out of area 700). By deactivating WAP 120-B and switching client devices 130-B to WAP 120-A, control device 110 may minimize unnecessary operation of both WAP 120-A and WAP 120-B when only one (or none) of these components is needed to satisfy desired performance levels, thereby, saving power.

It should be appreciated that the number of WAPs 120 and/or client device 130 displayed in FIGS. 7A-7E is provided solely for purposes of example, and area 700 may include additional or few components. For example, area 700 may include additional WAPs 120, a sensor to detect client device 130, a component (e.g., a signal repeater) that connects WAPs 120 to client device 130, etc.

Figure 8:
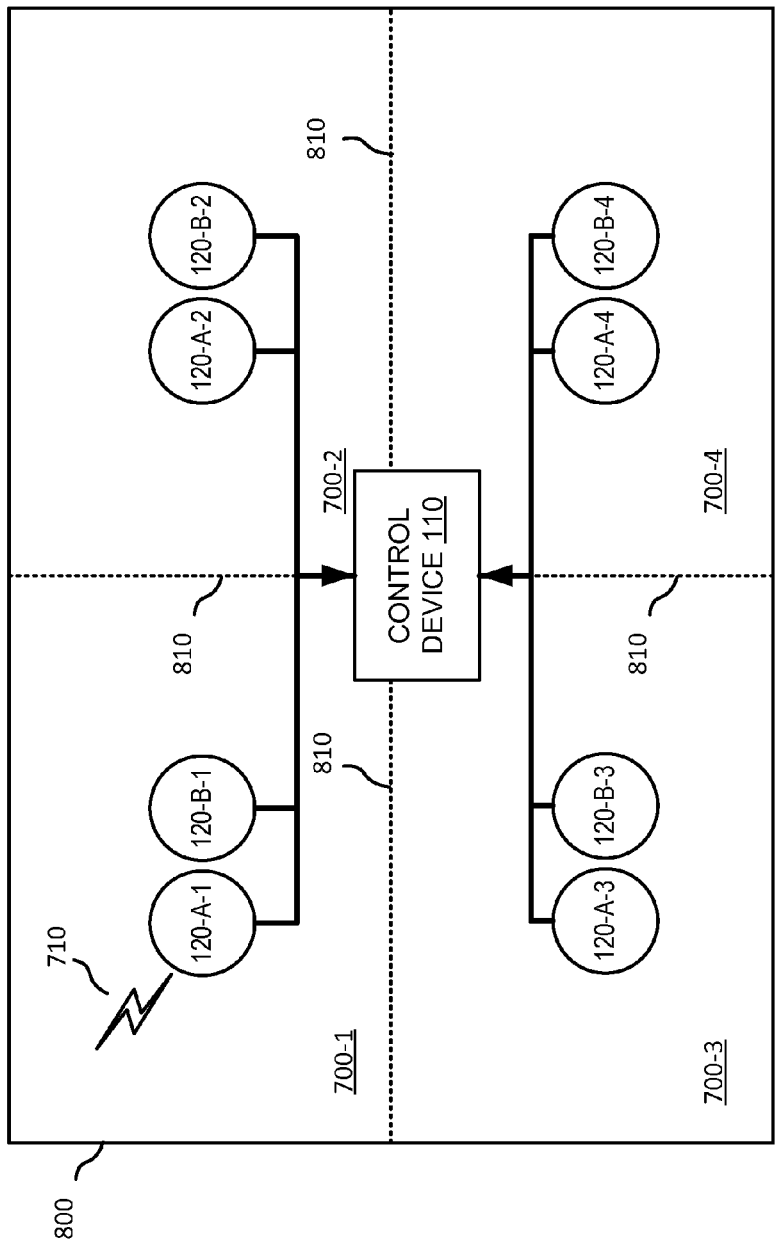

FIG. 8 shows a composite region 800 that includes multiple areas 700-1, 700-2, 700-3, 700-4 separated by boundaries 810 in one implementation. As shown in FIG. 8, control device 110 may monitor and control operations of WAPs 120 in the multiple areas 700-1, 700-2, 700-3, 700-4. Composite region 800 may correspond, for example, to a building or campus (i.e., a group of buildings), and the four areas 700-1, 700-2, 700-3, 700-4 may correspond, for example, to different floors or portions of the office building or to different buildings in the campus.

In the example of FIG. 8, control device 110 may cause WAP 120-A-1 in area 700-1 to be activated (e.g., send and receive communications signals 710) while WAP 120-B-1 in area 700-1 remains inactive and WAPs 120 in other areas 700-2, 700-3, and 700-4 (i.e., depicted WAPs 120-A-2, 120-B-2, 120-A-3, 120-B-3, 120-A-4, and 120-B-4) also remain inactive. In this situation, composite region 800 may correspond, for example, to an office during non-business hours such that access to network 140 is provided via WAP 120-A-1 in area 700-1 while WAPs 120 located in other areas are deactivated. For example, area 700-1 may correspond to an entrance and/or common area of the office such that an arrival of client device 130 is detected, and WAPs 120 in area 700-1 or the other areas 700-2, 700-3, and 700-4 may be activated or deactivated as needed based on detecting the arrival of client device 130.

In one implementation, control device 110 may determine the presence of a user associated with client device 130 based on environmental factors. For example, control device 110 may detect that the user has entered area 700 when lights are activated and/or climate controls are altered in area 700. Similarly, movement of the user throughout composite region 800 may be determined based on monitoring connection requests by client device 130 and/or determining activated WAPs 120 within composite region 800.

In one implementation, control device 110 may further provide instructions to other devices within the composite region 800, such as activating environmental controls based on the status of WAPs 120 and/or client devices 130. For example, control device 110 may activate lights, heating, etc., in a particular area 700 when a client device 130 connects to a WAP 120 associated with the particular area 700.

In another implementation, control device 110 may determine the movement of client devices 130 within composite region 800. For example, control device 110 may determine the movement of client device 130 based on activating/deactivating WAPs 120 within composite region 800 to connect with client devices 130 (i.e., control device 110 may infer the location of a client device 130 based on the activating/deactivating of WAPs 120).

It should be appreciated that the number of control device 110, WAPs 120, and/or client device 130 displayed in FIG. 8 is provided solely for purposes of example, and composite region 800 may include additional or few components. For example, composite region 800 may include multiple control devices 110 to control areas 700-1, 700-2, 700-3, and 700-4. For example, one control device 110 may control WAPs 120 in areas 700-1 and 700-2, while another control device 110 may control WAPs 120 in other areas 700-3 and 700-4. In this situation, control devices 110 may communicate with one another to coordinate the operation of WAPs 120 within composite region 800.

FIG. 9 illustrates an exemplary status record 900 that may be stored by control device 110 in connection with monitoring and controlling WAPs 120 in one implementation. As shown in FIG. 9, status record 900 may include, for example, WAP identifier field 910, status field 920, recent activity field 930, a number of connected client devices field 940, preference data field 950, and an associated region identifier 960. For a particular WAP 120, WAP identifier field 910 may uniquely identify the particular WAP 120. For example, WAP identifier field 910 may be a network address, a serial number, a device brand, model type, etc., that may be used by control device 110 to uniquely identify the particular WAP 120. In operation, control device 110 may use data stored in WAP identifier field 910, for example, to send instructions to WAP 120.

For the particular WAP 120, control device 110 may store an indication of whether the particular WAP 120 is activated (i.e., providing a WLAN to connect to client devices 130) in status field 920. Control device 110 may determine that the particular WAP 120 is active if, for example, control device 110 has forwarded instructions to the particular WAP 120 to activate it and/or control device 110 has received feedback indicating that the particular WAP 120 is active. If the particular WAP 120 is active, control device 110 may further store an indication of an amount of data transmitted via the particular WAP 120 in recent activity field 930 and/or a number of client device 130 connected to the particular WAP 120 in field 940.

Control device 110 may further store preference data in preference data field 950. Preference data field 950 associated with a particular WAP 120 may indicate, for example, when the WAP 120 should be activated by default. For example, the data stored in preference data field 950 may correspond to the preference data determined in block 410.

For the particular WAP 120, status record 900 may also store information regarding a field associated with particular WAP 120 in region identifier field 960. Field 960 may identify, for example, one or more regions (or geographic locations) that are within communications range of the particular WAP 120.

Although an exemplary status record 900 record is shown in FIG. 9, it should be appreciated that status record 900 may include additional or fewer data fields. Furthermore, data identified as being stored in multiple fields of status record 900 may be stored in a single field, and portions of data identified as being stored in a single field of status record 900 may be stored in multiple fields.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 4-6, the order of the blocks may be modified in other implementations. Further, non-dependent blocks may be performed in parallel. Similarly, while a series of communications have been described with respect to FIGS. 4-6, the order of the communications may be modified and additional or few communications may be exchanged in other implementations.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
   determining, by a processor, preference information associated with a plurality of wireless access points (WAPs), wherein a first WAP of the plurality of WAPs includes a first port to provide a wired interface to a data network and a second port to provide an air interface to a wireless local area network (WLAN), and wherein the preference information includes data identifying that:
      a first expected quantity of client devices coupled to the WLAN during a first time period exceeds a first threshold,
      a second expected quantity of client devices coupled to the WLAN during a second time period is less than the first threshold, the second time period being after the first time period, and
      a third expected quantity of client devices coupled to the WLAN during a third time period exceeds the first threshold, the third time period being after the first time period and the second time period;
   forwarding, by the processor and based on the preference information, instructions to activate the first WAP during the first time period and third time period and to deactivate the first WAP during the second time period, wherein activating the first WAP during the first time period includes activating the first port and the second port,
   wherein deactivating the first WAP during the second time period includes:
      receiving, via the wired interface, data at the first port,
      buffering, by the first WAP, the received data, and
      deactivating the second port to prevent the received data from being transmitted via the air interface, and
   wherein reactivating the first WAP during the third time period includes:
      reactivating the second port to reestablish the air interface, and
      forwarding the buffered data via the air interface;
   determining, by the processor, status information associated with operation of the activated first WAP; and
   modifying, by the processor, operation of one or more of the plurality of WAPs based on the status information.

2. The method of claim 1, further comprising:
   identifying an area based on the preference information;
   identifying two or more WAPs, of the plurality of WAPs, associated with the area; and
   selecting the first WAP from the two or more WAPs.

3. The method of claim 2, wherein selecting the first WAP from the two or more WAPs includes:
   identifying a desired bandwidth; and
   selecting the first WAP from the two or more WAPs based on the desired bandwidth.

4. The method of claim 1, wherein modifying the operation of the one or more of the plurality of WAPs based on the status information includes:
   determining, based on the status information, an activity level associated with the activated first WAP, wherein the activity level relates to at least one of an amount of data associated with first WAP or a quantity of client devices connected to the first WAP; and
   modifying the operation of the one or more of the plurality of WAPs based on the activity level.

5. The method of claim 4, wherein modifying the operation of the one or more of the plurality of WAPs based on the activity level includes:
   determining that the activity level exceeds a second threshold; and
   activating a second WAP, of the plurality of WAPs, based on determining that the activity level exceeds the second threshold.

6. The method of claim 5, further comprising:
   identifying an area associated with the first WAP;
   identifying two or more WAPs, of the plurality of WAPs, associated with the area; and
   selecting the second WAP from the two or more WAPs.

7. The method of claim 4, wherein modifying the operation of the one or more of the plurality of WAPs based on the activity level includes:
   determining that the activity level is less than a second threshold during at least one of the first time period or the third time period; and
   deactivating the first WAP during the at least one of the first time period or the third time period based on determining that the activity level is less than the second threshold.

8. The method of claim 7, further comprising:
   determining, based on preference data, that deactivating the first WAP is permitted; and
   deactivating the first WAP further based on determining that deactivating the first WAP is permitted during the at least one of the first time period or the third time period.

9. The method of claim 1, wherein the first WAP is associated with a first area, and a second WAP, of the plurality of WAPs is associated with a second area, and
   wherein modifying the operation of the one or more of the plurality of WAPs based on the status information includes:
      determining that a client device, connected to the first WAP, moved from the first area to the second area; and activating the second WAP based on determining that the client device moved from the first area to the second area.

10. A device comprising:
a memory to store preference information associated with a plurality of wireless access points (WAPs), wherein a first WAP of the plurality of WAPs includes a first port to provide a wired interface to a data network and a second port to provide an air interface to a wireless local area network (WLAN), and wherein the preference information includes data identifying that:
   a first expected quantity of client devices coupled to the WLAN during a first time period exceeds a first threshold,
   a second expected quantity of client devices coupled to the WLAN during a second time period is less than the first threshold, the second time period being after the first time period, and
   a third expected quantity of client devices coupled to the WLAN during a third time period exceeds the first threshold, the third time period being after the first time period and the second time period; and
a processor configured to:
   forward, based on the preference information, instructions to activate the first WAP during the first time period and third time period and to deactivate the first WAP during the second time period,
   wherein the processor, when activating the first WAP during the first time period, is further configured to activate the first port and the second port,
   wherein the processor, when deactivating the first WAP during the second time period, is configured to cause the first WAP to receive, via the wired interface, data at the first port, buffer the received data, and deactivate the second port to prevent the received data from being transmitted via the air interface, and
   wherein the processor, when reactivating the first WAP during the third time period, is further configured to reactivate the second port to reestablish the air interface and cause the first WAP to forward the buffered data via the air interface,
   determine status information associated with operation of the activated first WAP, and
   modify operation of one or more of the plurality of WAPs based on the status information.

11. The device of claim 10, wherein the processor is further configured to:
   identify an area based on the preference information,
   identify two or more WAPs, of the plurality of WAPs, associated with the area, and
   select the first WAP from the two or more WAPs.

12. The device of claim 11, wherein the processor, when selecting the first WAP from the two or more WAP, is further configured to:
   identify a desired bandwidth, and
   select the first WAP from the two or more WAPs based on the desired bandwidth.

13. The device of claim 10, wherein the processor, when modifying the operation of the one or more of the plurality of WAPs based on the status information, is further configured to:
   determine, based on the status information, an activity level associated with the activated first WAP, wherein the activity level relates to at least one of an amount of data exchanged via the first WAP or a quantity of client devices connected to the first WAP, and
   modify the operation of the one or more of the plurality of WAPs based on the activity level.

14. The device of claim 13, wherein the processor, when modifying the operation of the one or more of the plurality of WAPs based on the activity level, is further configured to:
   determine that the activity level exceeds a second threshold, and
   activate a second WAP, of the plurality of WAPs, based on determining that the activity level exceeds the second threshold.

15. The device of claim 14, wherein the processor is further configured to:
   identify an area associated with the first WAP,
   identify two or more WAPs, of the plurality of WAPs, associated with the area, and
   select the second WAP from the two or more WAPs.

16. The device of claim 14, wherein the processor, when modifying the operation of the one or more of the plurality of WAPs based on the activity level, is further configured to:
   determine that the activity level is less than a second threshold during one of the first time period or the third time period, and
   deactivate the first WAP during the one of the first time period or the third time period based on determining that the activity level is less than the second threshold.

17. The device of claim 10, wherein the processor, when modifying the operation of the one or more of the plurality of WAPs based on the status information, is further configured to:
   identify a client device connected to the first WAP during one of the first time period or the third time period,
   forward instructions to activate a second WAP of the plurality of WAPs,
   forward, based on the second WAP being activated, an message to the client device via the first WAP, wherein the message causes the client device to disconnect from the first WAP and to connect to the second WAP, and
   forward instructions to deactivate the first WAP during the one of the first time period or the third time period based on forwarding the message.

18. A non-transitory computer-readable medium to store instructions, the instructions comprising:
   one or more instructions that, when executed by a processor, cause the processor to be configured to:
   store preference information associated with a plurality of wireless access points (WAPs), wherein a first WAP of the plurality of WAPs includes a first port to provide a wired interface to a data network and a second port to provide an air interface to a wireless local area network (WLAN), and wherein the preference information includes data identifying that:
      a first expected quantity of client devices coupled to the WLAN during a first time period exceeds a first threshold,
      a second expected quantity of client devices coupled to the WLAN during a second time period is less than the first threshold, the second time period being after the first time period, and
      a third expected quantity of client devices coupled to the WLAN during a third time period exceeds the first threshold, the third time period being after the first time period and the second time period,
   forward, based on the preference information, instructions to activate the first WAP during the first time period and third time period and to deactivate the first WAP during the second time period, wherein activating the first WAP during the first time period includes activating the first port and the second port, wherein deactivating the first WAP during the second time period includes:
  receiving, via the wired interface, data at the first port,
  buffering, by the first WAP, the received data, and
  deactivating the second port to prevent the received data from being transmitted via the air interface, and wherein reactivating the first WAP during the third time period includes:
  reactivating the second port to reestablish the air interface, and
  forwarding the buffered data via the air interface,
  determine status information associated with operation of the activated first WAP, and
  modify operation of one or more of the plurality of WAPs based on the status information.

19. The non-transitory computer-readable medium of claim 18, wherein the first WAP is associated with a first area, and a second WAP, of the plurality of WAPs is associated with a second area, and
  wherein the one or more instructions to modify the operation of the one or more of the plurality of WAPs based on the status information further include:
  one or more instructions that, when executed by the processor, cause the processor to be further configured to:
    determine that a client device, connected to the first WAP, moved from the first area to the second area, and
    activate the second WAP based on determining that the client device moved from the first area to the second area.

20. The non-transitory computer-readable medium of claim 18, wherein the one or more instructions to modify the operation of the one or more of the plurality of WAPs based on the status information include:
  one or more instructions that, when executed by the processor, cause the processor to be further configured to:
    determine, based on the status information, an activity level associated with the activated first WAP, wherein the activity level relates to at least one of an amount of data exchanged by the first WAP or a quantity of client devices connected to the first WAP,
    determine whether the activity level exceeds a second threshold,
    activate a second WAP, of the plurality of WAPs, when the activity level exceeds the second threshold,
    determine whether the activity level is less than a third threshold during one of the first period or the third period, and
    deactivate the first WAP during the one of the first period or the third period based on determining that the activity level is less than third threshold.

* * * * *